United States Patent
Schluttig (10) Patent No.: US 10,428,500 B2
(45) Date of Patent: Oct. 1, 2019

(54) SELF-DISINFECTING DRAIN TRAP HAVING A COATING

(71) Applicant: Alexander Schluttig, Lauta (DE)

(72) Inventor: Alexander Schluttig, Lauta (DE)

(73) Assignee: Alexander Schluttig, Lauta (DE)

( * ) Notice: Subject to any disclaimer, the term of this patent is extended or adjusted under 35 U.S.C. 154(b) by 0 days.

(21) Appl. No.: 15/574,055

(22) PCT Filed: May 12, 2016

(86) PCT No.: PCT/EP2016/060767
§ 371 (c)(1),
(2) Date: Nov. 14, 2017

(87) PCT Pub. No.: WO2016/184786
PCT Pub. Date: Nov. 24, 2016

(65) Prior Publication Data
US 2018/0291602 A1    Oct. 11, 2018

(30) Foreign Application Priority Data
May 15, 2015    (DE) .......................... 10 2015 006 278

(51) Int. Cl.
*E03C 1/126*    (2006.01)
*E03C 1/28*    (2006.01)

(52) U.S. Cl.
CPC ............... *E03C 1/126* (2013.01); *E03C 1/28* (2013.01); *Y02A 20/202* (2018.01)

(58) Field of Classification Search
CPC .................................. E03C 1/126; E03C 1/28
(Continued)

(56) References Cited

U.S. PATENT DOCUMENTS

| 2,675,823 A | 4/1954 | Langdon |
|---|---|---|
| 4,980,056 A | 12/1990 | Norton |

(Continued)

FOREIGN PATENT DOCUMENTS

| DE | 37 38 231 | 5/1989 |
|---|---|---|
| DE | 9202902 U1 | 5/1992 |

(Continued)

OTHER PUBLICATIONS

Notification of Transmittal of the International Search Report and Written Opinion dated Aug. 24, 2016, issued in International Application No. PCT/EP2016/060767 (50 pages).

(Continued)

*Primary Examiner* — Christine J Skubinna
(74) *Attorney, Agent, or Firm* — Beem Patent Law Firm (57) ABSTRACT

The invention relates to a self-disinfecting drain trap in wastewater drains, having an automatic cleaning through an electromagnetic oscillator and an automatic disinfection through heat, UV-C radiation, antibacterial coating, or ultrasound. The inner wall of the drain trap may be coated with a titanium dioxide nano-coating, on which a catalytic oxidizing reduction of organic substances that can be oxidized takes place, and microorganisms are killed. The titanium dioxide nano-coating may be activated through irradiation with at least one light source located inside or outside the drain trap. When the cleaning and disinfection functions are inactive, a retrograde microbial contamination of the barrier fluid is prevented, both on the part of the wastewater drain as well as through the ambient air, through the oxidizing disinfecting effect of the titanium dioxide nano-coating.

9 Claims, 9 Drawing Sheets (58) Field of Classification Search
USPC .......................................................... 4/679
See application file for complete search history.

(56) References Cited

U.S. PATENT DOCUMENTS

| | | | |
|---|---|---|---|
| 4,989,056 A | | 1/1991 | Hiraiwa et al. |
| 6,666,966 B1 * | | 12/2003 | Schluttig ................ E03C 1/126 |
| | | | 210/163 |
| 7,175,911 B2 * | | 2/2007 | Zhou ..................... B01D 53/86 |
| | | | 428/403 |
| 2005/0263195 A1 | | 12/2005 | Dahm |
| 2006/0272542 A1 | | 5/2006 | Horner et al. |
| 2006/0138031 A1 | | 6/2006 | Kloos et al. |
| 2006/0192137 A1 | | 8/2006 | Helmore et al. |
| 2007/0163943 A1 | | 7/2007 | Collins et al. |
| 2009/0020172 A1 | | 1/2009 | Walker |
| 2009/0211019 A1 | | 8/2009 | Schluttig |
| 2010/0297577 A1 | | 11/2010 | Cohen |
| 2011/0036417 A1 | | 2/2011 | McAlpine |
| 2014/0311979 A1 | | 10/2014 | Schluttig |
| 2015/0158750 A1 * | | 6/2015 | Schiffmann ............... C02F 1/32 |
| | | | 210/739 |

FOREIGN PATENT DOCUMENTS

| | | |
|---|---|---|
| DE | 199 18 221 | 7/2000 |
| DE | 199 18 211 | 10/2000 |
| DE | 102005015129 | 10/2006 |
| DE | 20 2007 000153 | 3/2007 |
| DE | 102009042212 A1 | 4/2011 |
| DE | 202013010964 U1 | 2/2014 |
| EP | 0 020 157 | 12/1980 |
| EP | 1 159 493 | 12/2001 |
| JP | 11 090432 | 4/1999 |
| JP | 2004292477 A | 10/2004 |
| WO | 053857 A1 | 9/2000 |
| WO | WO 2000/053857 | 9/2000 |
| WO | 2006102015 A2 | 9/2006 |

OTHER PUBLICATIONS

International Search Report and Written Opinion, dated Jun. 26, 2012, issued in International Application No. PCT/EP2011/005789 (4 pages).

International Preliminary Report on Patentability; dated May 8, 2013; issued in International Application No. PCT/EP2011/005789 (13 pages). English translation attached.

* cited by examiner

SELF-DISINFECTING DRAIN TRAP HAVING A COATING

This application claims benefit of PCT/EP2016/060767 filed May 12, 2016, which claims benefit of German Patent Application No. 10 2015 006 278, filed May 15, 2015, both of which are incorporated by reference in its entirety.

BACKGROUND

1. Technical Field

The invention relates to a self-disinfecting drain trap in wastewater drains, having devices for automatic disinfection and cleaning during use and without interruption of the intended barrier function, wherein the device for cleaning the drain trap is at least one electromechanical oscillator, and the device(s) for disinfection of the drain trap body is/are at least one device selected from the group composed of heating elements, UV-C lamps, antibacterial coating and ultrasonic transducers, and at least one light source is arranged inside or outside the drain trap body.

2. Background

It has long been known in clinical and nursing facilities that drain traps and the so-called barrier liquids located therein may contain pathogenic microorganisms, which end up in the surrounding atmosphere through aerosol formation during the intended use thereof.

Drain traps have been described (WO 2000/053857 A1, DE 10 2009 042 212 A1), in which the barrier fluids and the interior of the drain trap are both automatically mechanically cleaned as well as physically disinfected during operation and without an inacceptable interruption of the hydraulic barrier function.

The term "self-disinfecting drain traps" (BE/AE: self-disinfected siphons, self-disinfecting drain traps) has been selected for these drain traps.

Self-disinfecting drain traps clean and sterilize themselves automatically in a disinfecting manner and without interruption of the barrier function of the drain trap. In this manner, sterilization of the aerosols resulting during the intended use is guaranteed, independently of human interference and without additional expenditure in terms of time and work.

These self-disinfecting drain traps, based on WO 2000/053857 A1 are capable of fully killing off 10 million bacteria per milliliter of barrier fluid within 30 minutes through thermal disinfection or UV-C radiation (7 log steps in 30 minutes), and thus generate disinfected or sterile barrier fluids in drain traps (test protocol A 13228as, Dec. 17, 2013, Hygiene Nord GmbH).

These self-disinfecting drain traps are composed in accordance with the invention of an assembly of devices for disinfection (heat, UV-C radiation, ultrasound) and cleaning (vibration). In particular, the combination of heat disinfection with low-frequency vibration cleaning has proven in clinical practice to be extremely effective, and has thus led to a new standard in sanitary hygiene for clinical high-risk areas (KRAMER, 2013).

Self-disinfecting drain traps according to the prior art (WO 2000/053857 A1, DE 10 2009 042 212 A1) exhibit two substantial disadvantages, however:

(1) Accumulation of organic cell substances in the disinfected barrier fluids from the microorganisms that have been killed off. This results in the emission of these organic cell substances through aerosol formation and the distribution thereof on surrounding surfaces and the hands of the nursing staff and patients when the disinfected, sterile drain trap is in use.

These organic components serve on one hand as nutrients for other microbes, and on the other hand, have a negative effect on patients, e.g. triggering inflammation, in the form of endotoxins and pyrogens exiting the drain trap through aerosol formation. These cell components that have been released escape to the exterior through aerosol formation during the intended use of the drain trap, and thus accumulate on surrounding surfaces. In particular, the drinking water faucets (water taps) located in the immediate vicinity of the drain trap are at risk therefrom. The colonization of microorganisms on and in the drinking water faucets—so-called retrograde microbial contamination—is substantially accelerated through the presence of nutrients, which have been transported through the aerosol formation onto the relevant drinking water faucet from the disinfected siphon.

The release of substances such as toxins and pyrogens can also lead directly to harming of patients, in particular those with immunosuppression and allergies. Thus, pyrogens, for example, are capable of triggering "cold" infections, in which all of the symptoms of an illness are present, but it is impossible to detect any pathogens.

The results depicted in failing to eliminate cell substances in the disinfected barrier fluid were not initially foreseeable in the use of the self-disinfecting drain trap, because drain traps without microorganisms in very high concentrations in the barrier fluid did not exist previously. These consequences first became apparent after many years of clinical use of self-disinfecting drain traps.

(2) Quick retrograde microbial contamination of the disinfected barrier fluid during takes place when the drain trap is not in use. Living microbes end up in the disinfected barrier fluid through the microbes in the ambient air at the supply side, and through gases containing microbes coming from the wastewater drains behind the self-disinfecting drain trap in the region of the drains. Because of the high content of microbial nutrients in the form of released cell substances, quick microbial resettlement occurs, if no disinfection is initiated through renewed supply of wastewater. These microorganisms then end up in the surroundings via aerosol formation the next time the self-disinfecting drain trap is used.

This retrograde microbial contamination of the disinfected barrier fluid, the surprising extent and significance of which was unforeseeable in the construction and introduction of the self-disinfecting drain traps according to the prior art, represents a substantial shortcoming in safety in clinical practice, and is therefore a substantial disadvantage in the use of self-disinfecting drain traps according to the prior art.

SUMMARY

The object of the invention is to create a self-disinfecting drain trap, which no longer exhibits the disadvantages described above—accumulation of microbial cell substances in the barrier fluid and quick retrograde microbial contamination in the barrier fluid through a quick reproduction of the microbes entering via the air and their subsequent emission, as well as the escaping of organic substances via aerosol formation when reused—while maintaining the high disinfection capacity thereof.

This object is achieved through a self-disinfecting drain trap with the additional use of a titanium dioxide nano-coating. The use of a catalytic oxidizing, super-hydrophilic, titanium dioxide nano-coating on the inner surface of the drain trap body enables the catalytic oxidation of organic substances released from the microorganisms that have been killed off during the intended disinfection, as well as those that end up in the drain trap with the liquid that is to be disposed of.

The self-disinfecting drain trap is arranged in wastewater drains and is provided with devices for automatic disinfection and cleaning during the use thereof, and without interruption of the intended barrier function. The device for cleaning the drain trap body is at least one electromechanical oscillator, and the device(s) for disinfection of the drain trap body is/are at least one device selected from the group comprising heating elements, UV-C lamps, antibacterial coating, and ultrasonic transducers. At least one light source is arranged inside or outside the drain trap body. The drain trap body is provided with a titanium dioxide nano-coating on the interior, which is activated by light sources located inside or outside the drain trap body.

Suitable drain traps having a known construction are preferably those described in WO 2000/053857 A1 and DE 10 2009 042 212 A1. The contents of the patent applications WO 2000/053857 A1 and DE 10 2009 042 212 A1 are hereby included in this application.

Self-disinfecting drain traps clean and sterilize themselves automatically and without interruption of the barrier function of the drain trap.

Moreover, microorganisms entering from the air during when the self-disinfecting drain trap is not in operation are killed off on contact with the active titanium dioxide nano-coating. Following excitation through light radiation, the oxidation of organic substances takes place, and the killing off of microorganism occurs automatically on the catalytically active titanium dioxide nano-coating.

The use of the titanium dioxide nano-coating described herein is novel for drain traps, and results in a self-disinfecting drain trap with the technological implementation thereof, which does not exhibit the disadvantages described above for the self-disinfecting drain trap according to the prior art.

Nano-coatings are characterized by the smallest possible particle sizes and maximum surface ratios. The titanium dioxide nano-coating is an oxidizing catalytic coating with super-hydrophilic properties, which requires an additional excitation through light having a low wavelength for the catalytic effect, preferably light having a wavelength of 370 to 450 nm. The coating is only active when it has been irradiated, wherein a certain after-reaction occurs. The coating is only active where it has been irradiated. The advantages of the titanium dioxide nano-coating for the self-disinfecting drain trap exist in the three reaction steps:
 a) Killing off of microorganisms
 b) Oxidation of the organic substances released from the dead microorganisms (including pyrogens)
 c) Prevention of the formation of biofilms through super-hydrophilic properties: the adhesion of particles of any type is impossible.

The titanium dioxide nano-coating is chemically altered in one embodiment through doping with chemical additives, e.g. with metal ions, such that light radiation having wavelengths above the UV-A range can also be used as activation radiation.

The wall of the drain trap is composed of either opaque substances, preferably metal or ceramics, or materials through which UV-C radiation or UV-A radiation can pass, preferably silica glass, glass or plastic.

In one embodiment, the self-disinfecting drain trap is connected to the sanitary component via a relief valve, or bleeder valve. The sanitary component is preferably a sink, a rinsing basin, a bathtub, a shower, or a delivery tub. The relief valve, or bleeder valve, is preferably provided with a titanium dioxide nano-coating on the interior. The activation of the titanium dioxide nano-coating in the relief valves, or bleeder valves, takes place either from the interior through light sources installed therein, or from the exterior through an irradiating unit that can be placed on the opening of the relief valve, or bleeder valve, which is equipped with at least one light source, or through both simultaneously.

The complex tube geometry of the drain trap, the necessary availability of light radiation of defined wavelengths and energy content, as well as the stability of the titanium dioxide nano-coating with respect to the abrasive effects caused by the flowing wastewater and the barrier fluid, initially prevented the use of titanium dioxide nano technology for drain traps.

Through their specialized geometry and the use of different substances, drain traps make the use of proven methods for generating highly active titanium dioxide nano-coatings impossible, such as cold gas spray methods, plasma coating, electrodeposition, spin coating, thermal oxidation in an oxygen atmosphere, etc. The use of nano-technological coatings inside drain traps is therefore not obvious.

For this reason, a modified sol-gel process is used, which enables the coating of the drain trap in an immersion process. The modified sol-gel process enables a uniform coating of the drain trap that is also substantially resistant to abrasion.

An immersion coating takes place with the modified sol-gel process, which must be repeated numerous times due to the geometry of the drain trap and the high requirements for abrasion resistance (up to 15 times). Following each immersion in the colloidal solution (sol), the new coating is dried, e.g. for 1 hour at 130° C., and after each fifth immersion, a thermal processing is carried out, e.g. at 250° C. This process results in a highly active, very abrasion-resistant coating.

The specialized geometry of drain traps also requires an optimization of the installation of the LED lamps, in order to ensure a uniform energetic impact to the titanium dioxide nano-coating, preferably with ca. 1 mW/cm2.

Due to the geometry of the drain trap, preferably numerous UV-A LED lamps are used, in order to enable a uniform irradiation of the coated inner wall of the drain trap. When glass through which UV-A radiation can pass is used as the wall material (wall thicknesses of 1 mm) for the drain trap, two LED lamps, of 2.2 watts each (=1.8 W radometrically) have been determined to be sufficient for ensuring the maximum disinfection capacity of 1.2 log/h.

The use of special surface enlargers and baffles serves to enlarge the active surface of the titanium dioxide nano-coating. Experiments for increasing the oxidation capacity (i.e. the quantity of oxidized organic substances per ml per time unit) have led to the development of elements for enlarging the active surface (surface enlargers), which can be introduced temporarily as needed into the drain trap.

In one embodiment, one or more surface enlargers made of an opaque material or transparent material is arranged in the interior of the drain trap, which is provided on one or both sides with a titanium dioxide nano-coating, and the transparent material is preferably glass, silica glass, or plastic.

The surface enlarger is preferably composed of a transparent material, preferably glass or plastic. The surface enlarger is provided on one or both sides with a primer coating and the titanium dioxide nano-coating. The shape of the surface enlarger can vary, wherein it is shaped such that it leads to an enlargement of the surface that is provided with an active titanium dioxide nano-coating. The shape of the surface enlarger is also such that, through the introduction thereof into the drain trap, the hydraulic cross section thereof remains substantially constant, such that its hydraulic properties are altered as little as possible. In addition to the function of enlarging the available active titanium dioxide nano-coating, the surface enlarger also serves to convert laminar currents into turbulence, thus increasing the reaction speed (disinfection capacity) during the use of the drain trap. The disinfection capacity of the self-disinfecting drain trap is defined as the removal of living microorganisms per time unit (log steps per hour=log/h). In some experiments, the disinfection capacity could be increased by 25% to 35% in comparison with a drain trap without a surface enlarger. Non-pathogenic gram-positive (*Staphylococcus aureus*) and gram-negative (*Pseudomonas aeruginosa*) bacteria were used in the laboratory tests.

In another embodiment, baffles are placed in the interior of the drain trap, the surfaces of which are likewise provided with a titanium dioxide nano-coating. The introduction of baffles preferably takes place in drain trap bodies made of transparent material, particularly preferably glass.

Devices that serve as "flow disrupters" and are made of the wall material of the reactor, normally produced through inward pressure, are used as the baffles. They serve to convert laminar or rotational flows into turbulences. This results in an increase in the mixing of the reactants, and increases the reaction speed. The baffles are preferably formed through imaginations in the wall of the drain trap. In some experiments with non-pathogenic gram-positive (*Staphylococcus aureus*) and gram-negative (*Pseudomonas aeruginosa*) bacteria, the disinfection capacity could be increased by 15% to 20% in comparison with a drain trap without baffles.

The self-disinfecting drain trap enables the prevention of the disadvantages described above, of the accumulation of microbial cell substances in the barrier fluid and the quick retrograde microbial contamination of the barrier fluid through a quick reproduction of the microbes brought into the barrier fluid via the air and their subsequent emission, as well as the escaping of organic substances via aerosol formation when reused, while maintaining the high disinfection capacity (killing of 10 million microorganisms per milliliter barrier fluid within 30 minutes). When the cleaning and disinfection functions are inactive, a retrograde microbial contamination of the barrier fluid is prevented by the titanium dioxide nano-coating, both on the part of the wastewater drain as well as through the ambient air, through the oxidizing disinfecting effect of the titanium dioxide nano-coating.

One part of the invention is a self-disinfecting drain trap in wastewater drains, having devices for automatic disinfection and cleaning during use and without interruption of the intended barrier function, in which the cleaning takes place through the equipping of drain trap bodies of known designs with electromechanical oscillators, and the disinfection takes place through at least one heating element, one UV-C lamp, one antibacterial coating, and one ultrasonic transducer, or a combination of these components, characterized in that the drain trap body is provided on the interior with a titanium dioxide nano-coating, which is activated by light sources located inside or outside the drain trap body.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The invention shall be explained in greater detail below based on numerous exemplary embodiments.

Exemplary Embodiment 1

Figure 1A:
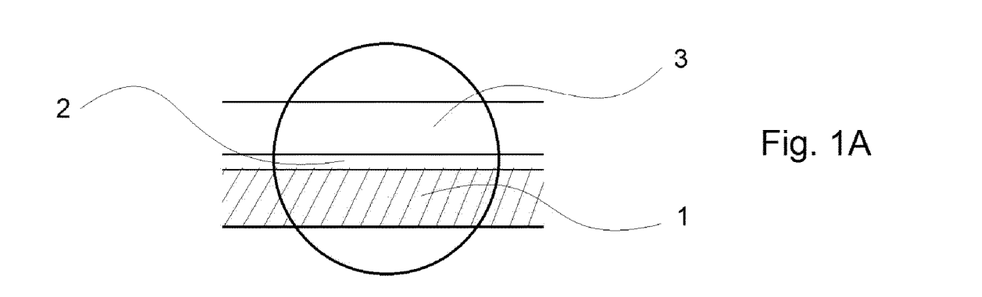
FIGS. 1A and 1B show diagrams depicting exemplary coated walls of exemplary drain trap bodies.
Figure 1B:
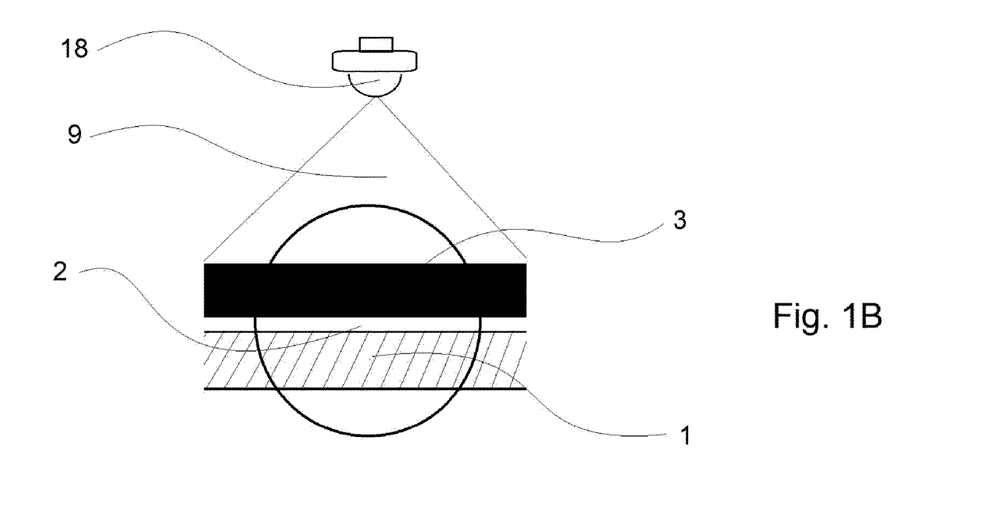

The construction of the titanium dioxide nano-coating 3 is depicted in FIG. 1A and FIG. 1B based on a schematic section through the coated wall of the drain trap body 1. The wall of the drain trap body 1, which is composed of metal 1A or transparent glass 1B or transparent plastic, is provided on the interior with a primer coating 2, which enables the permanent adhesion of the titanium dioxide nano-coating 3 on the hydrophobic inner wall of the drain trap body 1A, 1B through its hydrophilic properties.

The initially inactive titanium dioxide nano-coating 3 in FIG. 1A is activated through irradiation with light by means of a light source 9 (FIG. 1B).

Exemplary Embodiment 2

Figure 2:
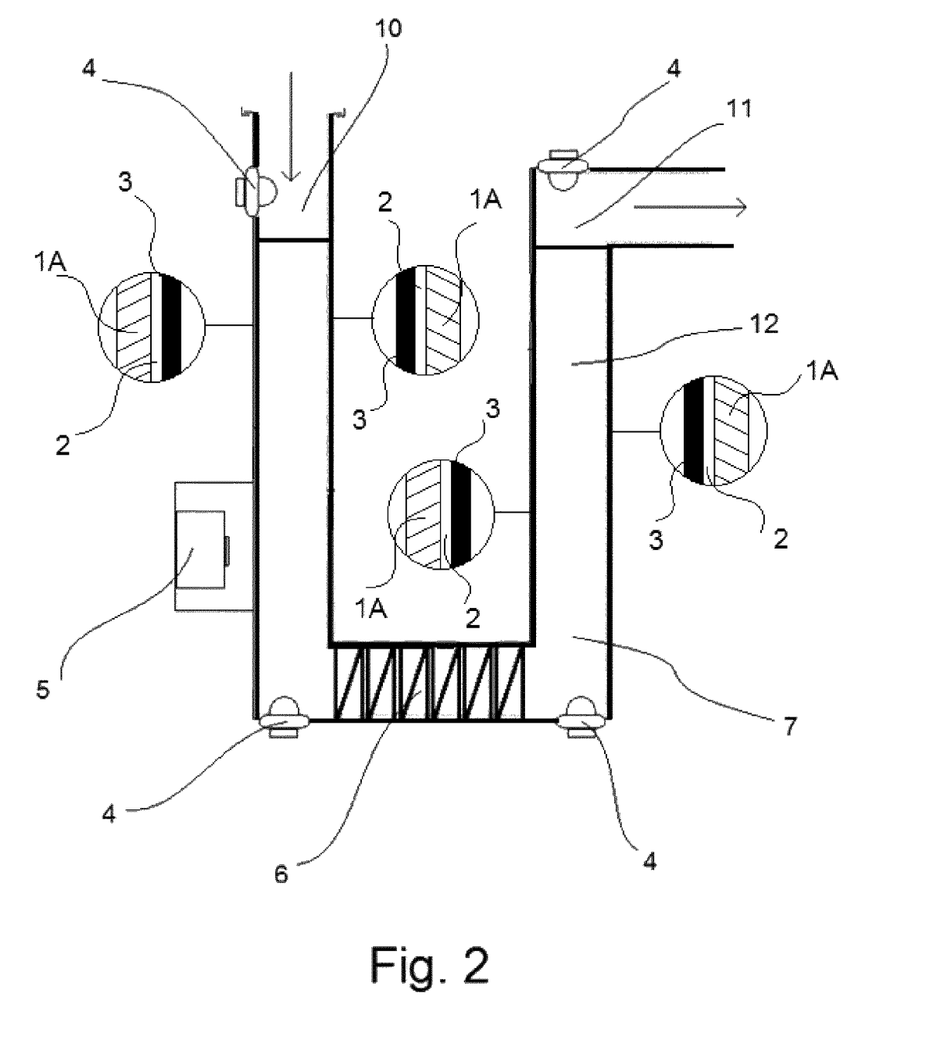
FIG. 2 shows a diagram depicting an exemplary self-disinfecting drain trap.

A self-disinfecting drain trap is depicted in FIG. 2, constructed from a drain trap body 1, at least one heating element for thermal disinfection 6 and one electromechanical oscillator 5 for mechanical cleaning, in which the inner wall 1A of the drain trap is provided with a titanium dioxide nano-coating 3. The activation of the titanium dioxide nano-coating 3 is obtained through LED lamps 4.

The LED lamps 4 are placed in the wall 1A of the drain trap body and extend into the barrier fluid 7. They fully irradiate the interior space 12 of the drain trap. In addition, further LED lamps 4 are arranged in the intake 10 and drain 11.

Exemplary Embodiment 3

Figure 3:
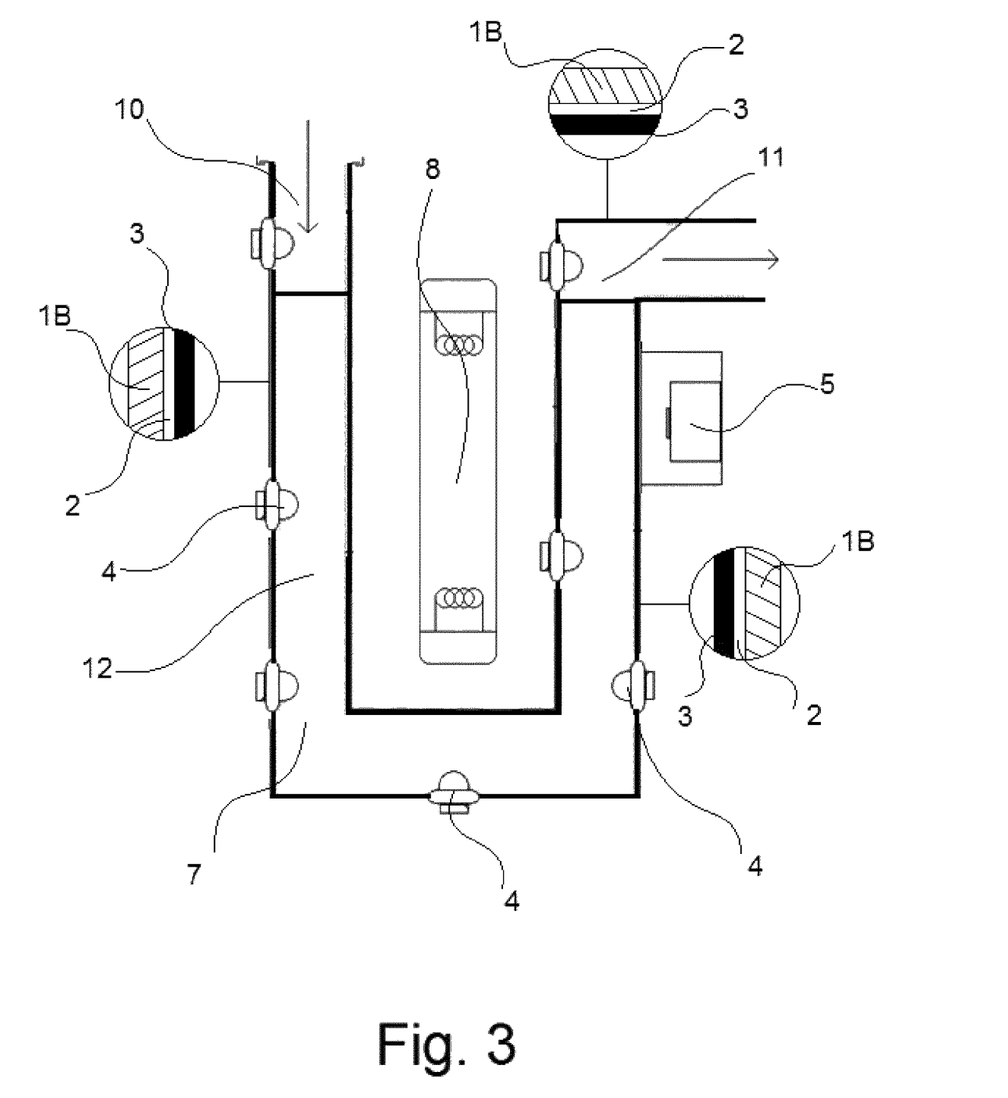
FIG. 3 shows a diagram depicting an exemplary self-disinfecting drain trap with a UV-C lamp.

A self-disinfecting drain trap is depicted in FIG. 3, composed of a drain trap body 1 made of silica glass 1B through which UV-C light can pass, a UV-C lamp 8 for disinfection through ultraviolet light (UV-C radiation), and an electromechanical oscillator 5 for cleaning. The inner wall 1B of the drain trap is provided with a titanium dioxide nano-coating 3. The activation of the titanium dioxide nano-coating is obtained through LED lamps 4.

The LED lamps 4 are placed in the wall of the drain trap body 1B, and extend into the barrier fluid 7. In addition, further LED lamps 4 are arranged in the intake 10 and the drain 11.

Exemplary Embodiment 4

Figure 4:
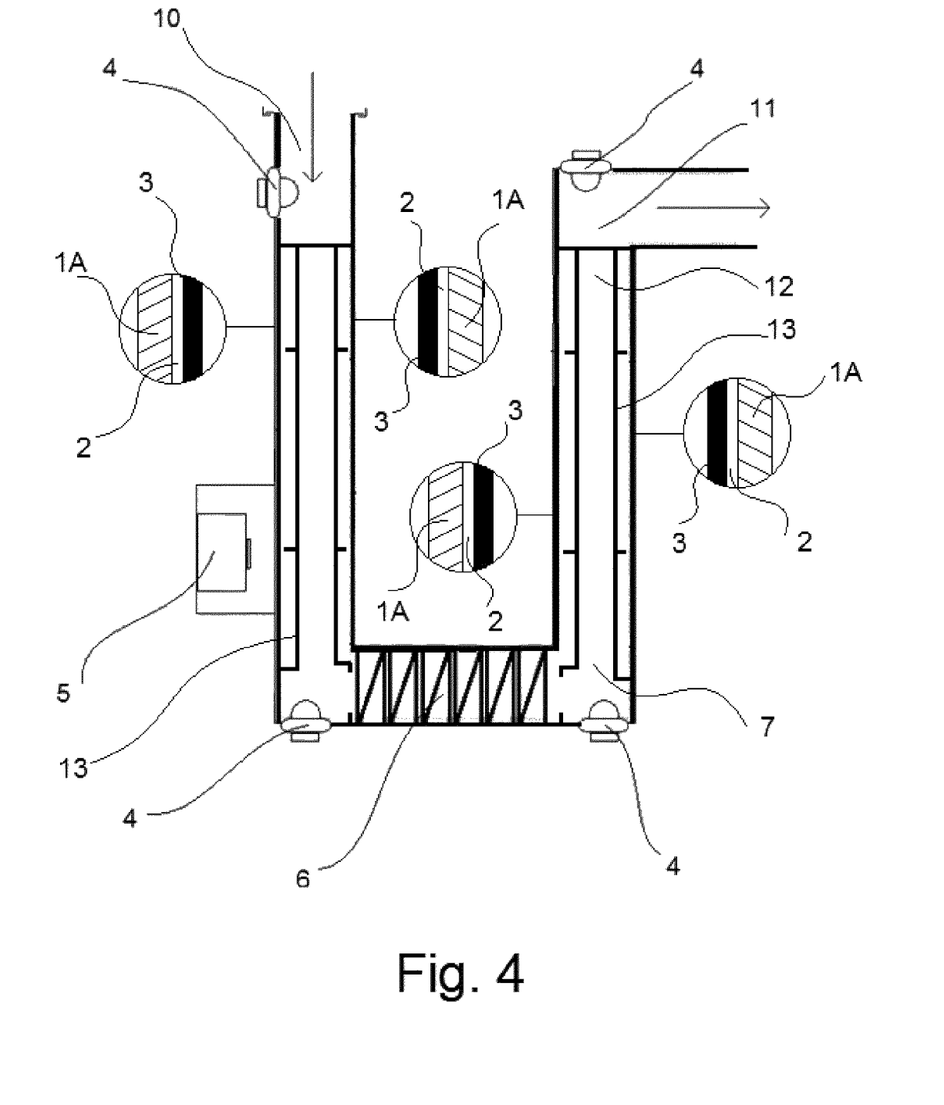
FIG. 4 shows a diagram depicting another exemplary self-disinfecting drain trap with surface enlargers.

A self-disinfecting drain trap is depicted in FIG. 4, constructed from a drain trap body 1, at least one heating element for thermal disinfection 6, and one electromechanical oscillator 5 for cleaning, in which the inner wall 1A of the drain trap is provided with a primer 2 and a titanium dioxide nano-coating 3. The activation of the titanium dioxide nano-coating 3 is obtained through LED lamps 4.

The LED lamps 4 are placed in the wall 1A of the drain trap body and extend into the barrier fluid 7. In addition, further LED lamps 4 are arranged in the intake 10 and drain 11. In order to increase the available oxidation capacity in the barrier fluid 7, surface enlargers 13 are introduced into the drain trap interior 12, the surfaces of which are likewise provided with a titanium dioxide nano-coating 3.

Exemplary Embodiment 5

Figure 5:
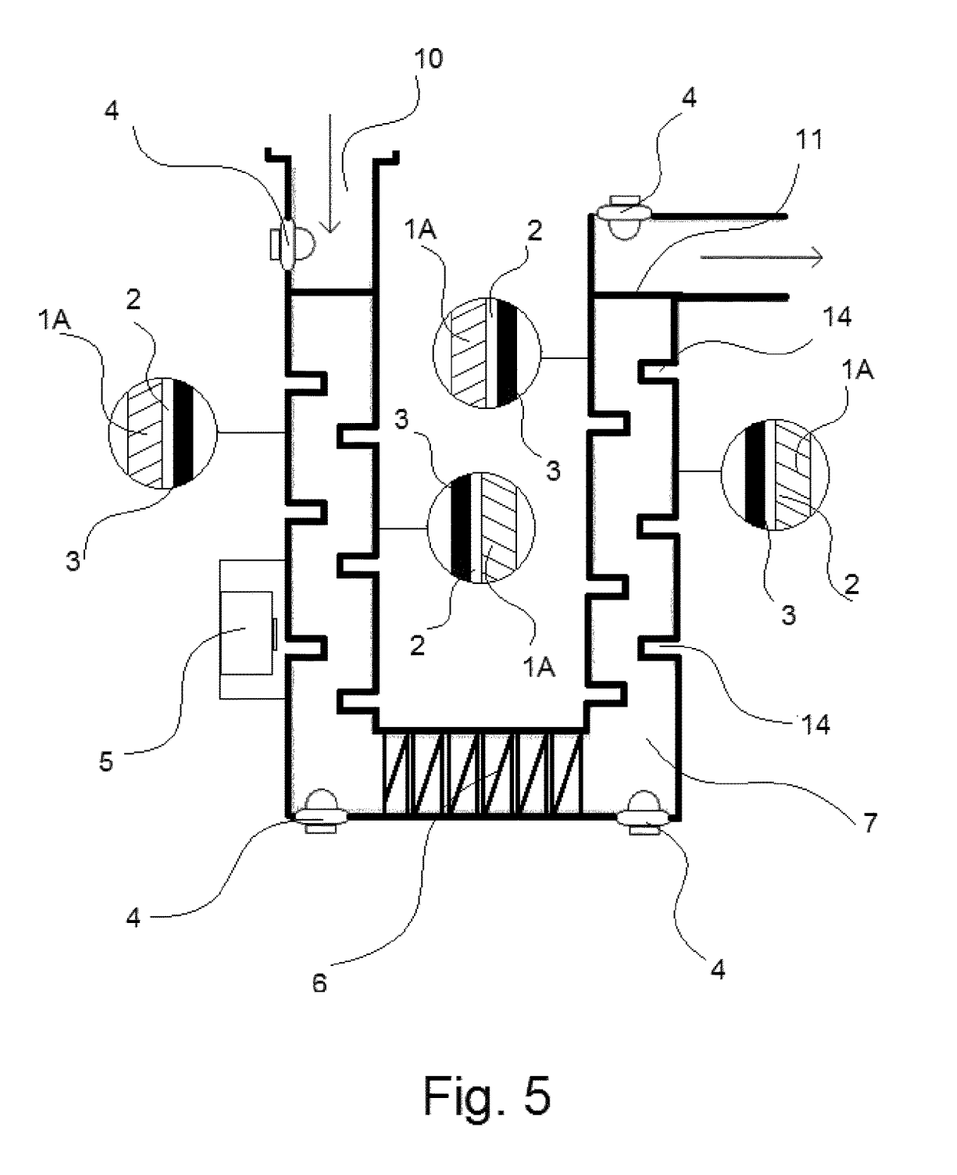
FIG. 5 shows a diagram depicting an exemplary self-disinfecting drain trap with an oscillator.

A self-disinfecting drain trap is depicted in FIG. 5, composed of a drain trap body 1, at least one heating element for thermal disinfection 6, and one electromagnetic oscillator 5 for cleaning, in which the inner wall 1A of the drain trap is provided with a titanium dioxide nano-coating 3. The activation of the titanium dioxide nano-coating 3 is obtained through LED lamps 4. The LED lamps 4 are placed in the wall 1A of the drain trap and extend into the barrier fluid 7. In addition, further LED lamps 4 are provided in the intake 10 and drain 11. In order to increase the available oxidation capacity of the barrier fluid 7, baffles 14 are introduced into the drain trap interior 12, which are likewise provided with a titanium dioxide nano-coating 3.

Exemplary Embodiment 6

Figure 6:
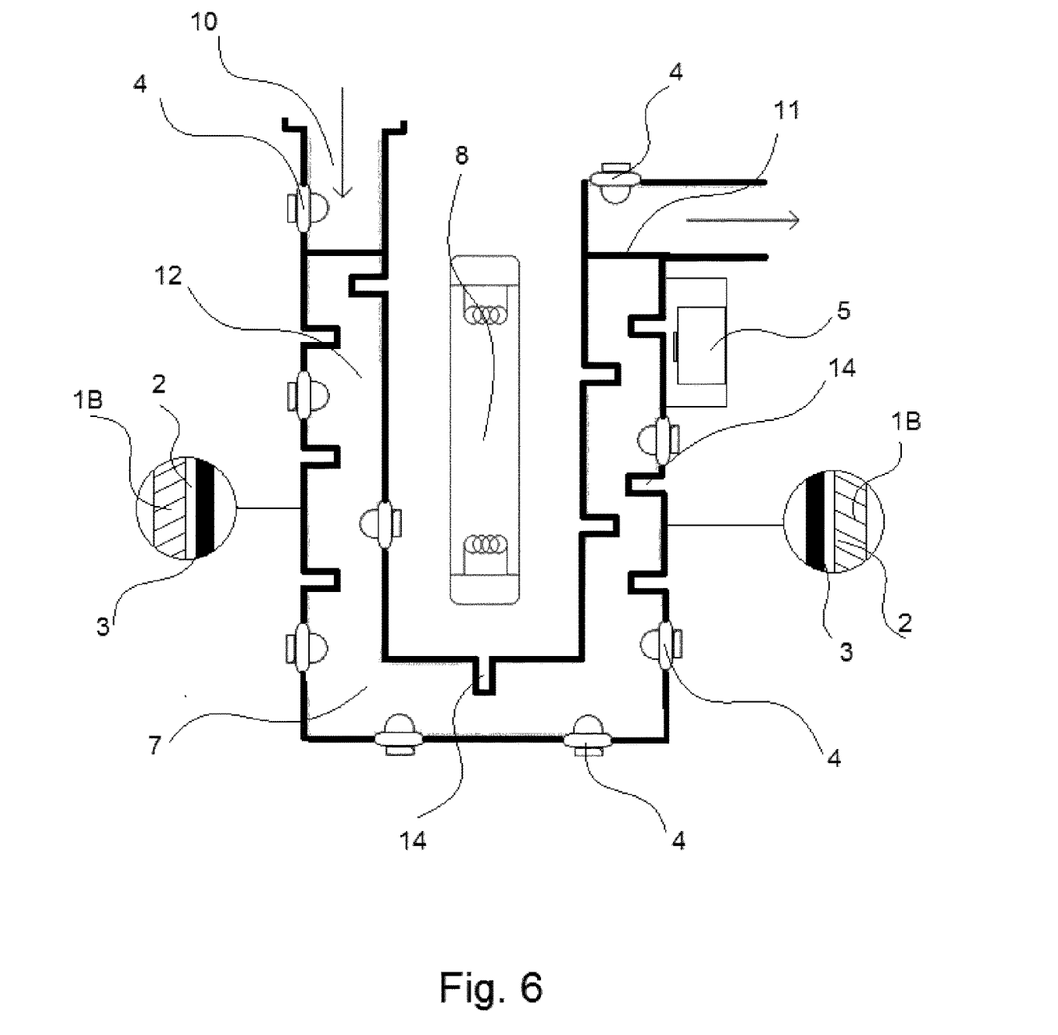
FIG. 6 shows a diagram depicting an exemplary self-disinfecting drain trap with baffles.

A self-disinfecting drain trap is depicted in FIG. 6, composed of a drain trap body 1B made of silica glass through which UV-C light can pass, a UV-C lamp 8 for disinfection through ultraviolet light (UV-C radiation), and an electromechanical oscillator 5 for cleaning. The inner wall 1B of the drain trap is provided with a titanium dioxide nano-coating 3. The activation of the titanium dioxide nano-coating is obtained through LED lamps 4.

The LED lamps 4 are placed in the wall 1B of the drain trap body and extend into the barrier fluid 7. In addition, further LED lamps are arranged in the intake 10 and drain 11. In order to increase the available oxidation capacity in the barrier fluid 7, baffles 14 are introduced into the drain trap interior 12, the surfaces of which are likewise provided with a titanium dioxide nano-coating.

Exemplary Embodiment 7

Figure 7:
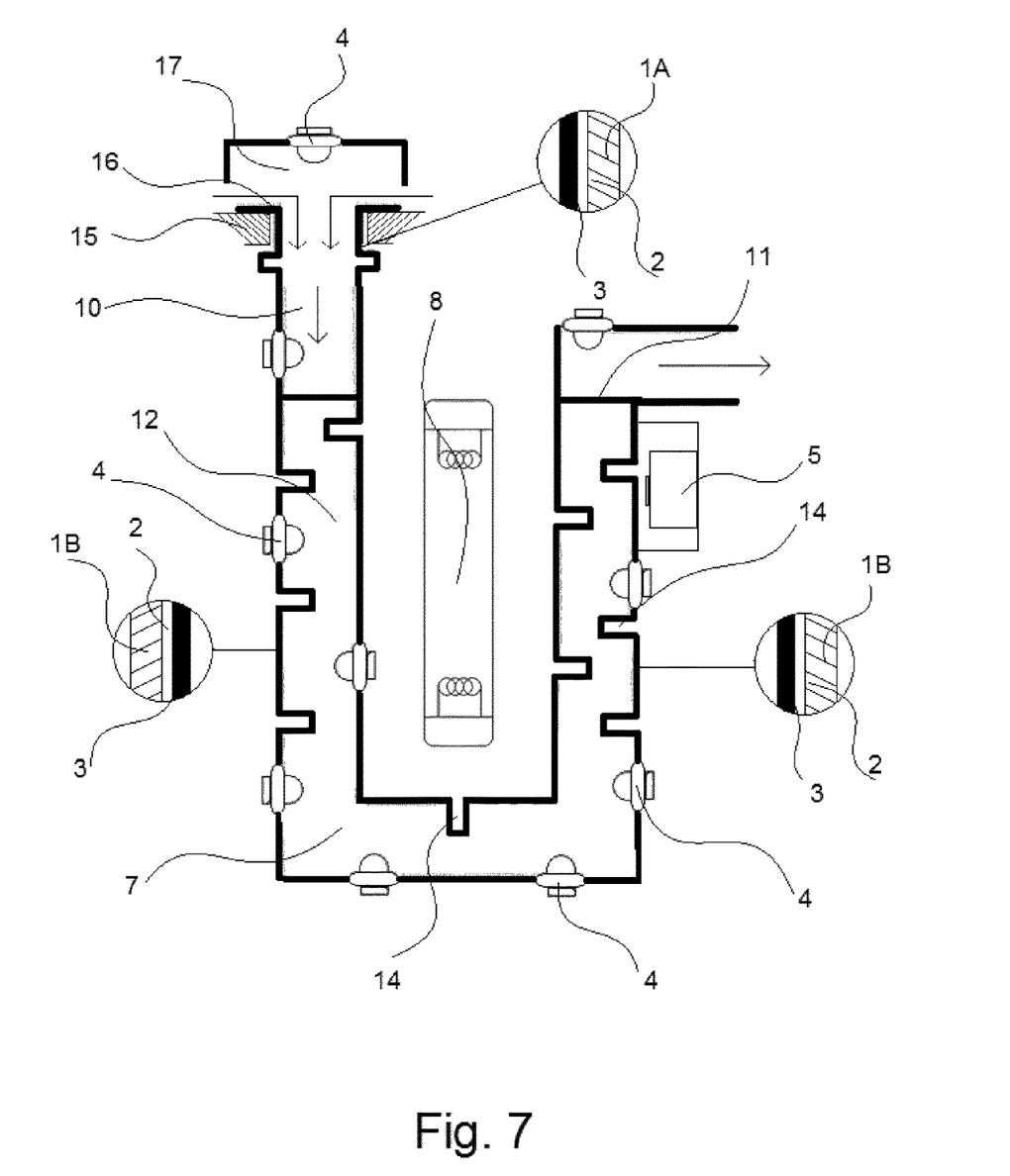
FIG. 7 shows a diagram depicting an exemplary self-disinfecting drain trap with baffles and a UV-C lamp.

A self-disinfecting drain trap is depicted in FIG. 7, composed of a drain trap body 1B made of a silica glass through which UV-C light can pass, a UV-C lamp 8 for disinfection of the drain trap interior 12 through ultraviolet light UV-C radiation, and an electromechanical oscillator 5 for cleaning. The inner wall 1B of the drain trap is provided with a titanium dioxide nano-coating 3. The activation of the titanium dioxide nano-coating 3 is obtained through LED lamps 4. The LED lamps 4 are placed in the wall 1B of the drain trap and extend into the barrier fluid 7. In addition, further LED lamps are arranged in the intake 10 and drain 11. In order to increase the available oxidation capacity in the barrier fluid 7, baffles 14 are introduced into the drain trap interior 12, the surfaces of which are likewise provided with a titanium dioxide nano-coating.

The connection of the self-disinfecting drain trap to the sanitary components, preferably the sinks 15, the rinsing basins, the bathtubs, the showers, and the delivery tubs, is obtained through relief valves, or bleeder valves 16, the interiors of which are likewise provided with a titanium dioxide nano-coating 3. The activation of the titanium dioxide nano-coating 3 in the relief valve or bleeder valve 16 is obtained both on the inside by means of LED lamps 4 installed in the drain trap, as well as on the outside by an irradiation unit 17, equipped with at least one light source 4, which can be placed on the opening of the relief valve or bleeder valve 16.

Exemplary Embodiment 8

Figure 8:
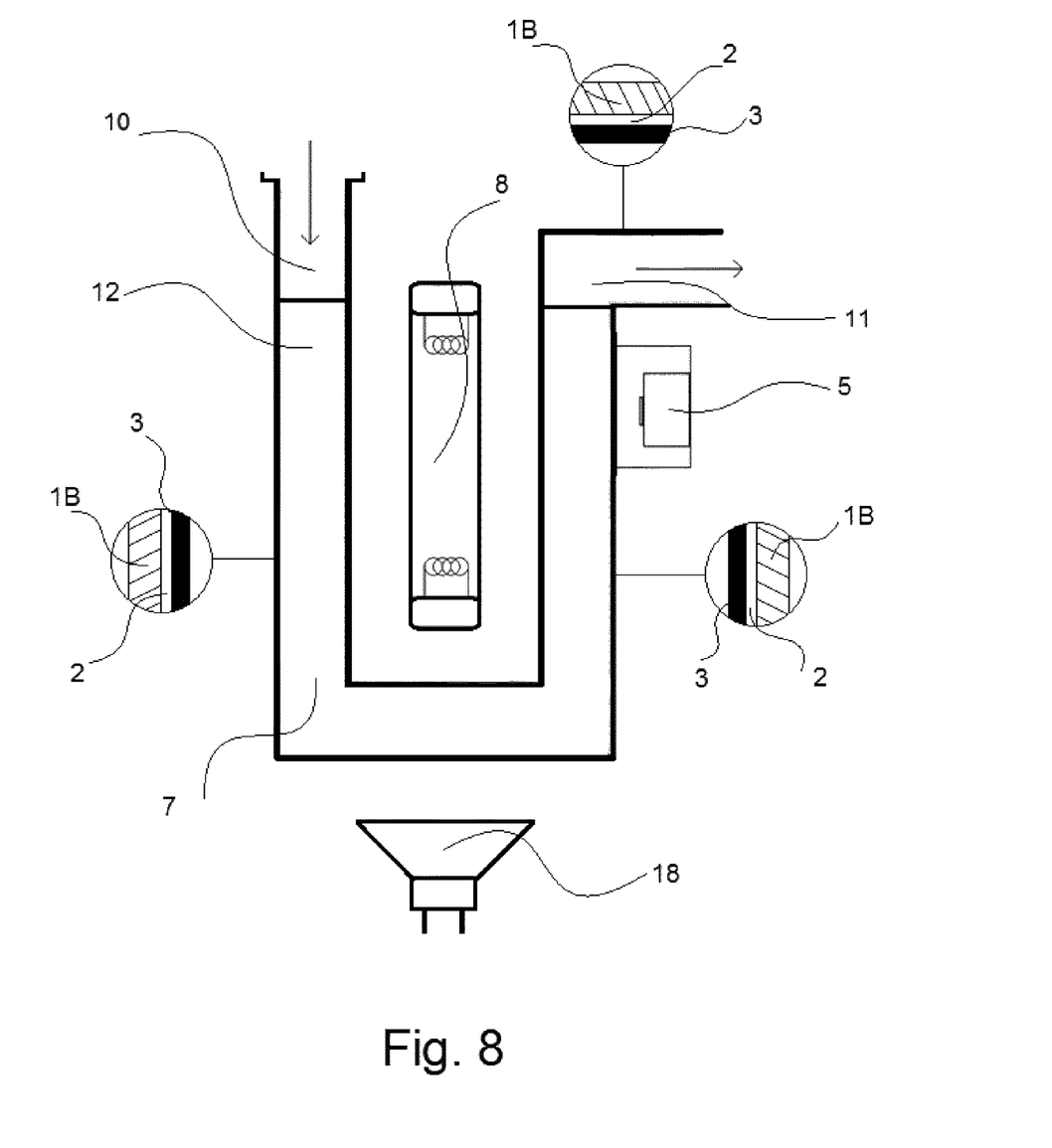
FIG. 8 shows a diagram depicting an exemplary self-disinfecting drain trap with a UV-C lamp, an oscillator, and a light projector.

A self-disinfecting drain trap is depicted in FIG. 8, composed of a drain trap body 1B made of silica glass through which UV-C light can pass, a UV-C lamp 8 for disinfection through ultraviolet light (UV-C radiation), and an electromechanical oscillator 5 for cleaning. The inner wall 1B of the drain trap is provided with a titanium dioxide nano-coating 3. The activation of the titanium dioxide nano-coating 3 is obtained through a light projector 18 installed outside the drain trap.

Exemplary Embodiment 9

Figure 9:
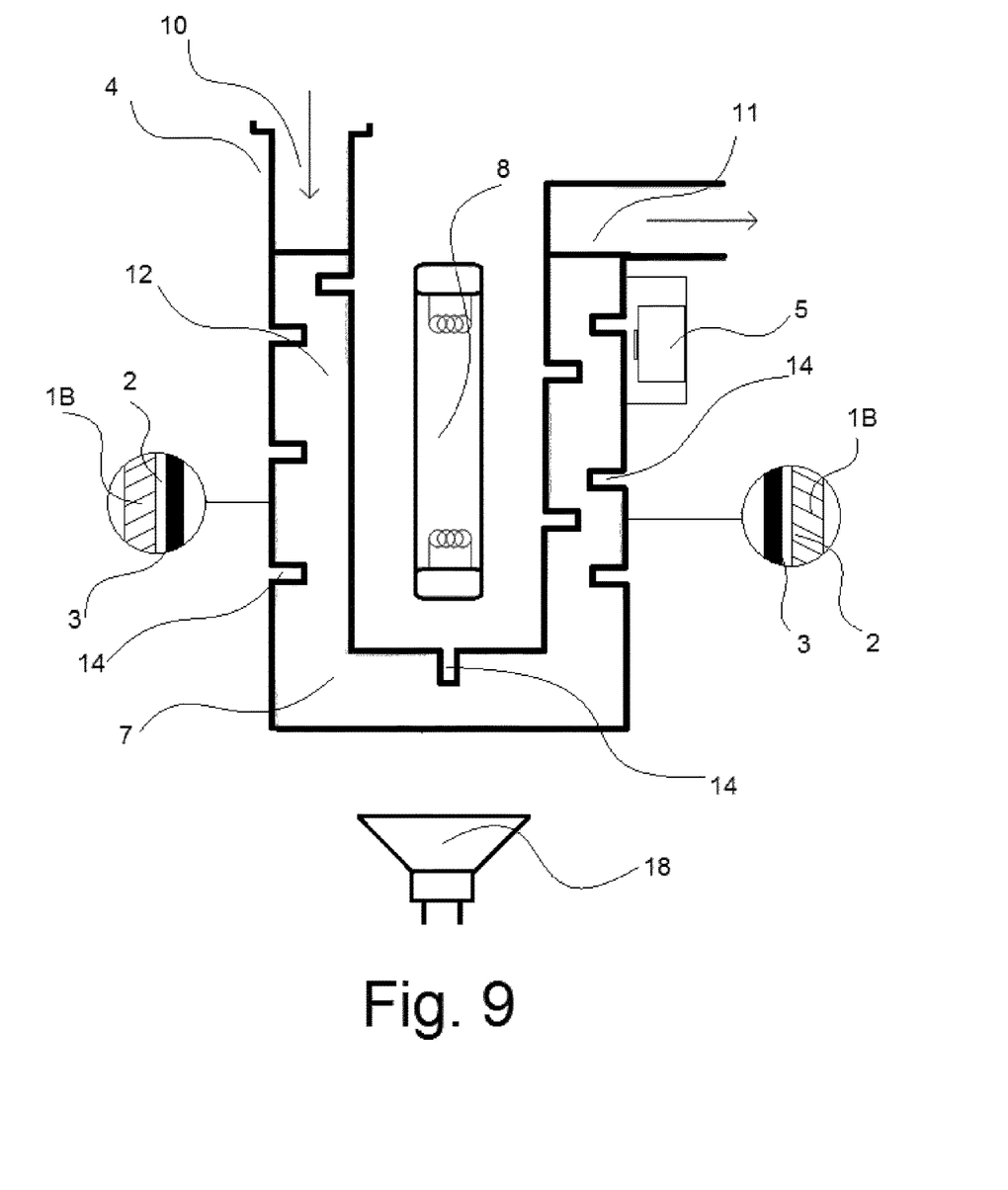
FIG. 9 shows a diagram depicting an exemplary self-disinfecting drain trap with a UV-C lamp, an oscillator, baffles, and a light projector.

A self-disinfecting drain trap is depicted in FIG. 9, composed of a drain trap body 1B made of silica glass through which UV-C light can pass, a UV-C lamp 8 for disinfection of the drain trap interior 12 through ultraviolet light (UV-C radiation), and an electromechanical oscillator 5 for cleaning. The drain trap body 1B made of silica glass is provided on the inside with a titanium dioxide nano-coating 3. The activation of the titanium dioxide nano-coating 3 is obtained through a light projector 18 installed outside the drain trap. In order to increase the available oxidation capacity in the barrier fluid 7, baffles 14 are introduced into the drain trap interior 12, the surfaces of which are likewise provided with a titanium dioxide nano-coating.

LIST OF REFERENCE SYMBOLS

Drain trap body 1
Wall of the drain trap body made of metal 1A
Wall of the drain trap body made of transparent glass 1B
Primer coating 2
Titanium dioxide nano-coating 3
LED lamp 4
Electromechanical oscillator 5
Heating element for thermal disinfection 6
Barrier fluid 7
UV-C lamp 8

Light source 9
Intake 10
Drain 11
Drain trap interior 12
Surface enlarger 13
Baffle 14
Sink or tub 15
Relief valve or bleeder valve 16
Attachable irradiating unit 17
Light projector 18

The invention claimed is:

1. A self-disinfecting drain trap for providing a fluid barrier in wastewater drains, comprising
 a drain trap body having an inner wall coated with a catalytic oxidizing, super-hydrophilic titanium dioxide nano-coating;
 an electromagnetic oscillator for automatic disinfection and cleaning the drain trap body during use and without disruption of the fluid barrier;
 a device for disinfecting the drain trap, the device selected from the group comprising heating elements, UV-C lamps, antibacterial coating, and ultrasonic transducers;
 a light source arranged inside or outside the drain trap body,
 where the catalytic oxidizing, super-hydrophilic titanium dioxide nano-coating may be activated by the light sources.

2. The self-disinfecting drain trap of claim 1, where the titanium dioxide nano-coating is chemically altered through doping with chemical additives, such that the coating is also activated by light radiation with wavelengths above the UV-A range.

3. The self-disinfecting drain trap of claim 1, where the wall of the drain trap is made of opaque materials, where said opaque materials is one of either metal or ceramics.

4. The self-disinfecting drain trap of claim 1, where one or more surface enlargers are disposed in the drain trap interior, where the surface enlargers are made of either opaque material, transparent material, or both, and where the surface enlargers have a titanium dioxide nano-coating on the interior, the exterior, or both.

5. The self-disinfecting drain trap of claim 1, where titanium dioxide nano-coated baffles are placed in the drain trap interior.

6. The self-disinfecting drain trap of claim 1, where the self-disinfecting drain trap is connected to the sanitary component by valves, where the valves are either relief valves, bleeder valves, or both, and where the valves have an interior having a titanium dioxide nano-coating.

7. The self-disinfecting drain of claim 6, where the titanium dioxide nano-coating in the valves is activated either from
 the interior through light sources installed therein,
 the exterior through an irradiating unit comprising at least one light source placed on the opening of the valve,
 or from both simultaneously.

8. The self-disinfecting drain trap of claim 1, where the wall of the drain trap body is first provided on the inside with a primer coating, to which the titanium dioxide nano-coating is applied.

9. The self-disinfecting drain trap of claim 1, where the wall of the drain trap is made of materials through which UV-C and/or UV-A radiation can pass, where said materials are selected from the group comprising silica glass, glass, and plastic.

* * * * *